(12) United States Patent
Bandyopadhyay

(10) Patent No.: US 9,273,594 B2
(45) Date of Patent: Mar. 1, 2016

(54) DUAL-FUEL ENGINE SYSTEM WITH BACKPRESSURE CONTROL

(71) Applicant: Electro-Motive Diesel, Inc., LaGrange, IL (US)

(72) Inventor: Deep Bandyopadhyay, Naperville, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 182 days.

(21) Appl. No.: 14/185,557

(22) Filed: Feb. 20, 2014

(65) Prior Publication Data

US 2015/0233282 A1 Aug. 20, 2015

(51) Int. Cl.
| | | |
|---|---|---|
| F01N 3/00 | (2006.01) |
| F01N 3/02 | (2006.01) |
| F01N 3/10 | (2006.01) |
| F01N 3/20 | (2006.01) |
| F02B 37/00 | (2006.01) |
| F02B 43/02 | (2006.01) |

(52) U.S. Cl.
CPC ................. *F02B 37/00* (2013.01); *F02B 43/02* (2013.01)

(58) Field of Classification Search
CPC .......... F02B 37/00; F02B 43/02; F02B 33/22; F02B 41/02; F02B 47/02
USPC .......................... 60/280, 281, 295, 602, 605.2
See application file for complete search history.

(56) References Cited

U.S. PATENT DOCUMENTS

| | | |
|---|---|---|
| 4,075,990 A | 2/1978 | Ribeton |
| 5,050,376 A | 9/1991 | Stiglic et al. |
| 5,079,921 A | 1/1992 | McCandless et al. |
| 6,430,929 B2 | 8/2002 | Martin |
| 2004/0231323 A1 | 11/2004 | Fujita et al. |
| 2009/0145398 A1* | 6/2009 | Kemeny ............... F02B 33/22 123/25 C |
| 2010/0132357 A1 | 6/2010 | Elsässer et al. |
| 2010/0229806 A1* | 9/2010 | Kemeny ............... F02B 33/22 123/2 |
| 2011/0146246 A1 | 6/2011 | Farman et al. |

FOREIGN PATENT DOCUMENTS

| | | |
|---|---|---|
| EP | 2143919 | 7/2008 |
| EP | 2672091 | 6/2012 |
| JP | 2009270434 | 11/2009 |

* cited by examiner

*Primary Examiner* — Audrey K Bradley
*Assistant Examiner* — Dapinder Singh
(74) *Attorney, Agent, or Firm* — Finnegan, Henderson, Farabow, Garrett & Dunner, LLP

(57) ABSTRACT

An engine system is disclosed. The engine system may have an engine with a plurality of cylinders, and at least one injector associated with each of the plurality of cylinders and configured to inject liquid fuel and gaseous fuel. The engine system may also have a turbocharger driven by exhaust from the plurality of cylinders to pressurize a flow of air directed into the plurality of cylinders, and a valve disposed inline with the turbocharger and configured to selectively increase an exhaust backpressure. The engine system may further have a controller configured to selectively cause movement of the valve toward a flow-restricting position only when the at least one injector is injecting gaseous fuel.

20 Claims, 1 Drawing Sheet

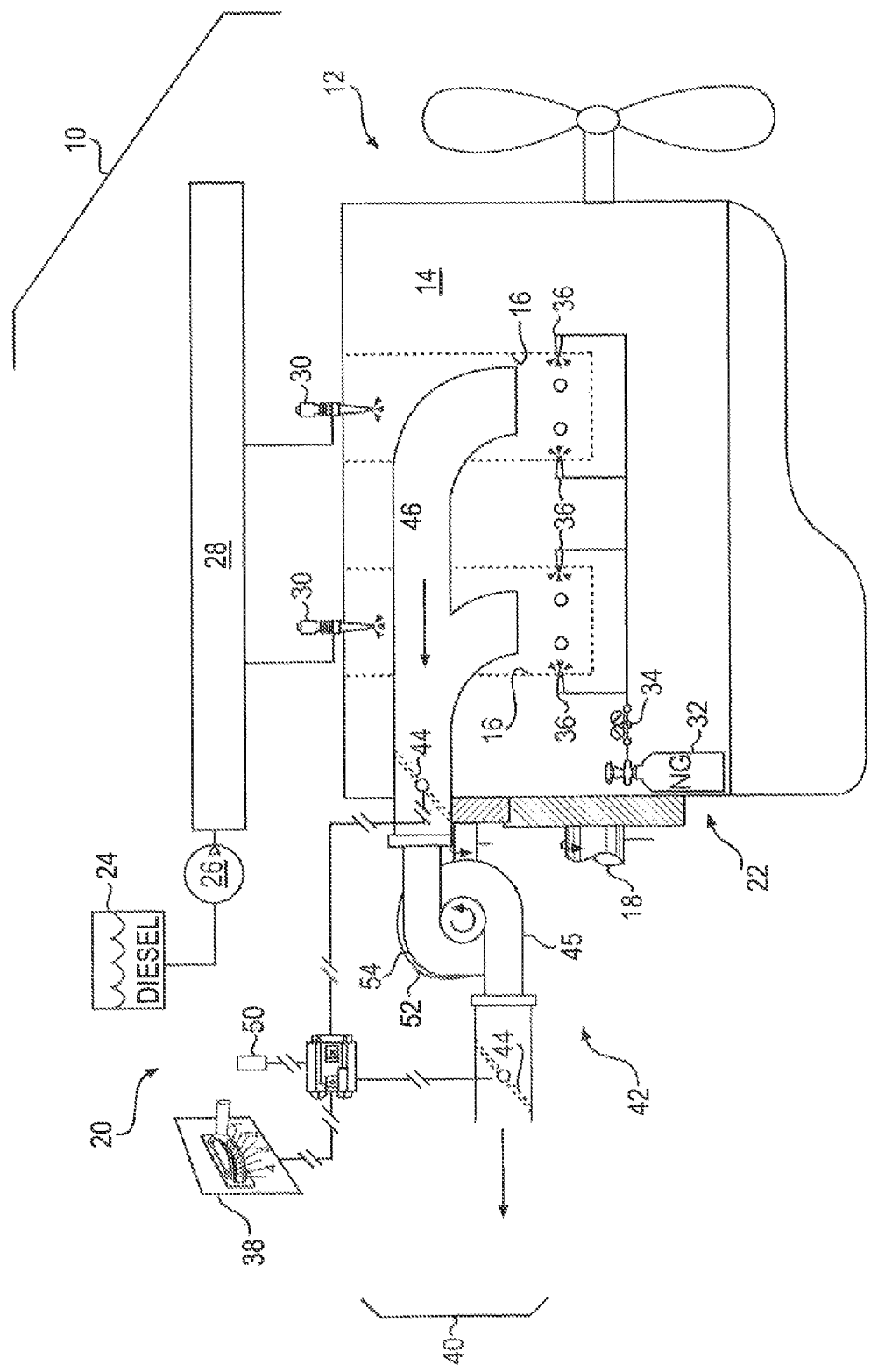

DUAL-FUEL ENGINE SYSTEM WITH BACKPRESSURE CONTROL

TECHNICAL FIELD

The present disclosure relates generally to a dual-fuel engine system and, more particularly, to a dual-fuel engine system with backpressure control.

BACKGROUND

An engine combusts a mixture of fuel and air to generate a mechanical power output, along with a flow of hot exhaust gases. A charged engine includes one or more compressors that are driven to compress combustion air entering the engine. By forcing compressed air into the engine, more air becomes available for combustion than could otherwise be drawn into the engine by motion of the engine's pistons. This increased supply of air allows for a corresponding increase in fueling, resulting in increased power output. A charged engine typically produces more power than the same engine without charging.

An engine can be charged in different ways. For example, the engine can be turbocharged, wherein a turbine is driven by hot exhaust gases produced by the engine and connected to mechanically drive the compressor. In another example, the compressor can be mechanically connected to a crankshaft of the engine and directly driven by the engine. When the compressor is mechanically connected to the crankshaft of an engine, the engine is said to be supercharged. In some situations, the engine can be both turbocharged and supercharged.

It may be possible for a compressor to supply too much air to an engine. For example, at low engine loads, a compressor can actually supply enough air to overly cool the engine and thereby reduce combustion efficiency and/or increase exhaust emissions. In addition, when the engine is supplied with gaseous fuel at low load settings, combustion can be quenched by the excess air.

One attempt to address these problems is disclosed in U.S. Pat. No. 5,079,921 of McCandless et al. that issued on Jan. 14, 1992 ("the '921 patent"). Specifically, the '921 patent discloses an exhaust backpressure control system having a valve in the exhaust outlet of a turbocharger. The valve is controlled by a microcomputer to close and restrict exhaust flow during startup of an engine. By restricting the exhaust flow, backpressure and friction are increased within the engine to thereby cause the engine to work harder and warm up quicker than would otherwise be possible. The valve is moved by the microcomputer as a function of an engine coolant temperature, engine speed, engine fuel consumption, and actual backpressure.

Although the exhaust backpressure control system of the '921 patent may be adequate in some situations, it may lack applicability to dual-fuel systems and/or to systems having a hybrid charged system (i.e., a system that is both turbocharged and supercharged).

The engine system of the present disclosure solves one or more of the problems set forth above and/or other problems in the art.

SUMMARY

In one aspect, the present disclosure is directed to an engine system. The engine system may include an engine with a plurality of cylinders, and at least one injector associated with each of the plurality of cylinders and configured to inject liquid fuel and gaseous fuel. The engine system may also include a turbocharger driven by exhaust from the plurality of cylinders to pressurize a flow of air directed into the plurality of cylinders, and a valve disposed inline with the turbocharger and configured to selectively increase an exhaust backpressure. The engine system may further include a controller configured to selectively cause movement of the valve toward a flow-restricting position only when the at least one injector is injecting gaseous fuel.

In another aspect, the present disclosure is directed to another engine system. This engine system may include an engine with a plurality of cylinders, and a turbocharger. The turbocharger may have a turbine driven by exhaust from the plurality of cylinders, and a compressor selectively driven by the turbine or the engine to pressurize a flow of air directed into the plurality of cylinders. The engine system may also include a valve disposed inline with the turbine and configured to selectively increase an exhaust backpressure, and a controller configured to selectively cause movement of the valve toward a flow-restricting position only when the compressor of the turbocharger is driven by the engine.

In yet another aspect, the present disclosure is directed to a method of controlling an engine. The method may include selectively driving a compressor with one of a turbine or the engine to compress air directed into the engine, and selectively directing liquid and gaseous fuel into the engine. The method may further include combusting a mixture of air and fuel in the engine to generate power and a flow of exhaust directed through the turbine, and determining a load on the engine. The method may additionally include selectively increasing an exhaust backpressure of the engine based on the load only when gaseous fuel is being injected into the engine and only when the compressor of the turbocharger is driven by the engine.

BRIEF DESCRIPTION OF THE DRAWING

FIG. 1 is a diagrammatic illustration of an exemplary disclosed engine.

DETAILED DESCRIPTION

FIG. 1 illustrates an engine system 10. For the purposes of this disclosure, engine system 10 is depicted and described as including a dual-fuel engine 12. One skilled in the art will recognize that engine 12 may be any type of dual-fuel engine such as, for example, a two- or four-stroke engine configured to combust a liquid fuel (e.g., diesel) and a gaseous fuel (e.g., natural gas). Engine system 10 may be associated with a mobile application (e.g., a train consist) or a stationary application (e.g., an electric power plant). When associated with the mobile application, it is contemplated that engine 12 may be located separately from supplies of the liquid and/or gaseous fuels, for example onboard a locomotive towing a tender car that contains the supplies of fuel.

Engine 12 may include an engine block 14 that at least partially defines a plurality of cylinders 16. A piston (not shown) may be slidably disposed within each cylinder 16 to reciprocate between a top-dead-center position and a bottom-dead-center position, and a cylinder head (not shown) may be associated with each cylinder 16. Each cylinder 16, piston, and cylinder head may together at least partially define a combustion chamber. In the illustrated embodiment, engine 12 includes two cylinders 16 for illustrative purposes only. It is contemplated that engine 12 may include a greater or lesser number of cylinders 16 and that cylinders 16 may be arranged in an inline configuration, in an opposing-piston configuration, in a V-configuration, or in another configuration, as desired. Combustion occurring within cylinders 16 may create a mechanical work output that drives the pistons to rotate a crankshaft 18.

Engine 12 may be equipped with a liquid fuel circuit 20 and a gaseous fuel circuit 22 that separately deliver liquid and gaseous fuels into cylinders 16. Liquid fuel circuit 20 may include, among other things, a fuel tank 24, a pump 26, a common rail 28, and at least one fuel injector 30 associated with each cylinder 16. Pump 26 may draw liquid fuel from tank 24, pressurize the liquid fuel, and direct the pressurized liquid fuel into common rail 28 for distribution to the different fuel injectors 30. Gaseous fuel circuit 22 may similarly include a fuel tank 32, a regulator 34, and at least one fuel injector 36 associated with each cylinder 16. Pressurized gaseous fuel contained within tank 32 may be selectively metered by regulator 34 through each of injectors 36 and into cylinders 16. In some embodiments, a common injector (not shown) may be used to inject both the liquid and gaseous fuels. In the disclosed embodiment, the liquid fuel is injected axially into each cylinder 16, while the gaseous fuel is separately injected radially (e.g., by way of one or more air inlet ports located within an annular wall of cylinder 16). It is contemplated, however, that both flows of fuel could alternatively be injected axially or both injected radially, as desired.

The injections of liquid and gaseous fuels may be coordinated based on operating conditions of engine 12. For example, at startup, engine 12 may be supplied primarily with liquid fuel. When operating at low loads (e.g., at or below a notch setting of 4), engine 12 may be supplied with a mixture of liquid and gaseous fuels. And at high engine loads (e.g., at or above a notch setting of 6), engine 12 may be supplied primarily with gaseous fuel. Other fueling strategies may also be employed. The notch settings associated with fueling of engine 12 may be manually selected by way of a throttle lever 38. It is contemplated that the notch settings may also or alternatively be automatically selected based on one or more different operating parameters (e.g., engine speed and/or travel speed).

Engine 12 may also be equipped with a charge air system 40. Charge air system 40 may include, among other things, a turbocharger 42 and a backpressure valve 44. Turbocharger 42 may include a turbine 54 located within an exhaust flow path 46 of cylinders 16, and a compressor 52 driven by turbine 54 to compress inlet air directed into cylinders 16. Turbine 54 may be mechanically connected to compressor 52 by way of a shaft 43, and turbine 54, compressor 52, and shaft 43 may be co-located within a common housing 45. In the disclosed embodiment, compressor 52 may also be selectively driven by engine 12 through a direct connection. Specifically, compressor 52 may be mechanically connected to crankshaft 18 and driven to compress air regardless of an exhaust flow passing through the associated turbine 54. Compressor 52 may be connected to crankshaft 18 by way of a gear train (shown in FIG. 1), a belt and pulley configuration, a cog and belt configuration, or in another configuration known in the art. In some embodiments, a clutch mechanism (not shown) may selectively connect compressor 52 of turbocharger 42 to crankshaft 18 during only low-load conditions when turbine 54 would otherwise provide insufficient thrust to drive compressor 52. Backpressure valve 44 may be located within exhaust flow path 46, upstream and/or downstream of turbine 54.

Backpressure valve 44 may be automatically moved between a first position and a second position. When in the first position, backpressure valve 44 may be completely open, and have little effect on the flow of exhaust passing therethrough. When in the second position, backpressure valve 44 may reduce an effective area of exhaust flow path 46, thereby creating a restriction that increases an upstream exhaust pressure. It is contemplated that when backpressure valve 44 is in the second position, some exhaust may still be allowed to flow past backpressure valve 44. In other words, backpressure valve may never completely block exhaust flow path 46. Although shown as a butterfly type valve 44, it is contemplated that backpressure valve 44 may be any other type of valve known in the art. An actuator (not shown) may be associated with backpressure valve 44 and cause backpressure valve 44 to move when energized.

A controller 48 may be configured to selectively energize the actuator and cause movement of backpressure valve 44 between the first and second positions based on one or more operating conditions of engine 12. Controller 48 may embody a single processor or multiple processors that include a means for controlling an operation of engine system 10. Numerous commercially available processors may perform the functions of controller 48. Controller 48 may include or be associated with a memory for storing data such as, for example, an operating condition, design limits, performance characteristics or specifications of engine system 10, operational instructions, and corresponding positions of backpressure valve 44. This data may be stored within the memory of controller 48 in the form of one or more lookup tables, as desired. Various other known circuits may be associated with controller 48, including power supply circuitry, signal-conditioning circuitry, solenoid driver circuitry, communication circuitry, and other appropriate circuitry. Moreover, controller 48 may be capable of communicating with other components of engine system 10 (e.g., with fuel circuits 20 and/or 22 of engine 12, with the clutch of turbocharger 42, with throttle lever 38, with backpressure valve 44, etc.) via either wired or wireless transmission. As such, controller 48 may be connected to or alternatively disposed in a location remote from engine 12.

Controller 48 may rely on signals from one or more sensors 50 to determine the operating conditions of engine 12 used as a basis for movement of backpressure valve 44. These sensors 50 may include, for example, any combination of an ambient air temperature sensor; an engine speed sensor; a coolant temperature sensor; an exhaust temperature, pressure, and/or flow rate sensor; a turbocharger clutch state sensor; etc. Signals generated by sensor(s) 50 may be directed to controller 48 for further processing. It is contemplated that controller 48 may directly reference values of these signals with the lookup tables stored in memory to determine a corresponding movement of backpressure valve 44, or controller 48 may alternatively use values of the signals to calculate other parameters that are then referenced with the lookup tables, as desired. For example, controller 48 may use an ambient air temperature signal and/or an exhaust temperature signal (alone or together with a fuel notch setting) to determine an amount of residual fuel within cylinders 16 (i.e., fuel that was unburned during a previous combustion cycle). Controller 48 may then reference the amount of residual fuel with the lookup table to determine a corresponding position of backpressure valve 44.

INDUSTRIAL APPLICABILITY

The disclosed engine system may be used in any application requiring low exhaust emissions, inexpensive operating costs, and consistent reliability. The disclosed engine system finds particular applicability in mobile applications such as train consists, where separate supplies of liquid and gaseous fuel can be easily accommodated within a tender car towed by a locomotive. The disclosed engine system may produce low emissions through the use of a unique and inexpensive blend of diesel fuel and natural gas. Consistent operation of the disclosed fuel system may be provided by way of backpressure valve 44. Operation of engine system 10 will now be described in detail.

As discussed above, engine system 10 may be able to operate using diesel fuel alone, natural gas alone, or varying combinations of diesel fuel and natural gas. For example, at startup of engine 12, diesel fuel alone may be advanced into cylinders 16 by injectors 30, along with air compressed by turbocharger 42. A mixture of the diesel fuel and compressed air may then be compression-ignited. After startup, natural gas may be injected at timings just before the injection of diesel fuel, to allow the natural gas to mix with the compressed air prior to combustion. In this situation, the injection of diesel fuel may initiate combustion of the gaseous fuel and air already in cylinders 16. As the load on engine 12 increases, a greater amount of natural gas may be injected into cylinders 16, compared to the amount of injected diesel fuel. Natural gas may be less expensive then diesel fuel, and produce lower amounts of regulated exhaust emissions. Accordingly, engine system 10 may operate more desirably at higher engine loads.

The load on engine 12 may correspond with the notch setting of throttle lever 38. For example, notch settings of about 4 and lower may correspond with low engine loads, wherein diesel fuel alone or both diesel fuel and some natural gas are injected into cylinders 16 (with a greater amount of the total fuel being diesel fuel). And notch settings of about 6 and higher may correspond with high engine loads, wherein primarily natural gas is injected.

When operating at relatively high engine loads, engine 12 may produce enough hot exhaust gases to adequately drive turbocharger 42. In particular, the exhaust gases may generate sufficient thrust within turbine 54 to drive compressor 52 with enough power to compress a large volume of air to a high pressure that supports efficient combustion within cylinders 16. However, at lower engine loads, the amount of exhaust produced by combustion within cylinders 16 may not drive turbocharger 42 to produce the right air flow. In these situations, compressor 52 may instead be selectively driven directly by engine 12 to compress air. For example, the clutch may automatically engage to mechanically connect compressor 52 to crankshaft 18. The clutch may engage at notch settings of about 4 or less, when diesel fuel alone or both diesel fuel and natural gas are being injected into cylinders 16.

In some situations, however, when compressor 52 is driven by engine 12, too much air may be pressurized and directed through cylinders 16. For example, during part load conditions when primarily natural gas is being injected into cylinders 16 (e.g., when about 80-85% of the injected fuel is natural gas) and the source of ignition is small (i.e., when very little diesel fuel is being injected), it may be possible to direct so much air into cylinders 16 that temperatures and/or air-to-fuel ratios within cylinders 16 fall below combustion thresholds (i.e., that combustion within cylinders 16 is actually quenched). Accordingly, it may be necessary to artificially raise in-cylinder temperatures during part load conditions.

In the disclosed example, the in-cylinder temperatures are artificially raised by selectively reducing the amount of air flowing into cylinders 16. When the amount of air flowing into cylinders 16 is reduced, a scavenging affect within cylinders 16 may also be proportionally reduced. That is, an amount of exhaust and residual fuel within cylinders 16 that would normally be pushed out by the incoming air can be reduced through reduction of the amount of incoming air. When this occurs, a greater amount of residual fuel is retained within cylinders 16 for the next combustion cycle, resulting in increased cylinder temperatures. In addition, a reduced flow of air through cylinders 16 may have a reduced cooling effect on cylinders 16.

Controller 48 may selectively decrease the amount of air flowing into cylinders 16 only at low engine loads (i.e., only at notch settings of about 4 or lower), only when gaseous fuel is being injected into cylinders 16 (alone or together with diesel), and only when compressor 52 is being directly driven by engine 12. Controller 48 may reduce the air flow by causing backpressure valve 44 to move to a more restrictive position that limits air flow through engine 12. Specifically, by closing backpressure valve 44, a pressure of the exhaust upstream of backpressure valve 44 may increase, resulting in an overall drop in pressure differential between incoming air and discharging exhaust. This drop in pressure differential may result in less air flowing through cylinders 16.

The flow-restricting position to which backpressure valve 44 is moved may vary, and be based on engine load and ambient temperature. For example, as the engine load reduces (i.e., as less fuel is being injected into cylinders 16), backpressure valve 44 may be moved to a more restrictive position. Similarly, as the ambient temperature reduces, backpressure valve 44 may be moved to a more restrictive position. Controller 48 may be configured to reference the load on engine 12 (i.e., the notch setting of throttle lever 38) and the ambient temperature (as provided by way of sensor 50) with the lookup table stored in memory to determine a corresponding flow-restricting position of backpressure valve 44. Controller 48 may then energize the actuator associated with backpressure valve 44 to cause movement to the desired position.

Controller 48, in some embodiments, may monitor the performance of engine 12 and selectively adjust the position of backpressure valve 44 based on the performance, even after backpressure valve 44 has been moved to the desired position. In particular, after determining the corresponding flow-restricting position of backpressure valve 44 and energizing the actuator to cause the desired movement, performance of engine 12 may still not be optimal. That is, the air-to-fuel ratio and/or temperature within cylinders 16 may still not support reliable and efficient combustion, and some unburned fuel may be discharged into the exhaust passing through turbocharger 42. Controller 48 may be configured to quantify this residual fuel and incrementally adjust the flow-restricting position of backpressure valve 44 until the amount of residual fuel is less than a threshold amount. Controller 48 may quantify the residual fuel based on a comparison of the notch setting of throttle lever 38, the ambient temperature, and an actual temperature of the exhaust. For example, based on a known inlet air temperature and an amount of fuel being directed into cylinders 16, controller 48 may calculate an expected exhaust temperature. And controller 48 may adjust the position of backpressure valve 44 until the actual exhaust temperature (as measured by sensor(s) 50) substantially matches the expected exhaust temperature.

Controller 48 may selectively cause movement of backpressure valve 44 to a non-restricting position based on engine load alone, based on clutch status alone, and/or based on ambient temperature alone. For example, regardless of clutch status or ambient temperature, controller 48 may cause backpressure valve 44 to move to a non-restricting position anytime the notch setting of throttle lever 38 reaches about 6 or higher. Similarly, regardless of notch setting or ambient temperature, controller 48 may cause backpressure valve 44 to move to a non-restricting position anytime compressor 52 is driven by turbine 54 (and not engine 12). Finally, regardless of notch setting or clutch status, controller 48 may cause backpressure valve 44 to move to a non-restricting position anytime ambient temperatures exceed a maximum threshold level (e.g., about 105° F.). Any one of these three conditions may signify a situation where combustion within cylinders 16 is reliable and efficient without intervention by controller 48.

It will be apparent to those skilled in the art that various modifications and variations can be made to the disclosed engine system without departing from the scope of the disclosure. Other embodiments of the engine system will be apparent to those skilled in the art from consideration of the specification and practice of the engine system disclosed herein. It is intended that the specification and examples be considered as exemplary only, with a true scope of the disclosure being indicated by the following claims and their equivalents.

What is claimed is:

1. An engine system, comprising:
   an engine having a plurality of cylinders;
   at least one injector associated with each of the plurality of cylinders and configured to inject liquid fuel and gaseous fuel;
   a turbocharger driven by exhaust from the plurality of cylinders to pressurize a flow of air directed into the plurality of cylinders;
   a valve disposed inline with the turbocharger and configured to selectively increase an exhaust backpressure; and
   a controller configured to selectively cause movement of the valve toward a flow-restricting position only when the at least one injector is injecting gaseous fuel.

2. The engine system of claim 1, wherein the controller is configured to move the valve to a non-restricting position when the ambient temperature is above a threshold temperature, regardless of engine load.

3. The engine system of claim 1, wherein the at least one injector includes:
   a first injector configured to inject only liquid fuel; and
   a second injector configured to inject only gaseous fuel.

4. The engine system of claim 1, wherein the controller is further configured to adjust the position of the valve based on an amount of residual fuel in the exhaust.

5. The engine system of claim 1, wherein the valve is located downstream of the turbocharger.

6. The engine system of claim 1, wherein:
   the turbocharger includes:
      a turbine; and
      a compressor connected to the turbine by a shaft;
   the compressor of the turbocharger is also selectively coupled for direct drive to a crankshaft of the engine; and
   the controller is configured to move the valve toward the flow-restricting position only when the compressor of the turbocharger is coupled to the crankshaft.

7. The engine system of claim 1, wherein the controller is configured to cause movement of the valve to a flow-restricting position corresponding to a load on the engine and an ambient temperature.

8. The engine system of claim 7, wherein the controller is configured to selectively cause movement of the valve toward the flow-restricting position only when the at least one injector is injecting gaseous fuel in an amount less than a threshold amount.

9. The engine system of claim 8, wherein the threshold amount corresponds to a notch setting of about 4 or less.

10. The engine system of claim 9, wherein the controller is configured to move the valve toward a position of greater flow restriction as the notch setting decreases.

11. The engine system of claim 10, wherein the controller is configured to move the valve toward a position of greater flow restriction as the ambient temperature decreases.

12. An engine system, comprising:
   an engine having a plurality of cylinders;
   a turbocharger having a turbine driven by exhaust from the plurality of cylinders, and a compressor selectively driven by the turbine or the engine to pressurize a flow of air directed into the plurality of cylinders;
   a valve disposed inline with the turbine and configured to selectively increase an exhaust backpressure; and
   a controller configured to selectively cause movement of the valve toward a flow-restricting position only when the compressor of the turbocharger is driven by the engine.

13. The engine system of claim 12, wherein the controller is further configured to adjust the position of the valve based on an amount of residual fuel in the exhaust.

14. The engine system of claim 12, wherein the valve is located downstream of the turbine.

15. The engine system of claim 12, wherein the engine further includes at least one injector associated with each of the plurality of cylinders and configured to inject liquid fuel and gaseous fuel.

16. The engine system of claim 15, wherein the at least one injector includes:
   a first injector configured to inject only liquid fuel; and
   a second injector configured to inject only gaseous fuel.

17. The engine system of claim 12, wherein the controller is configured to cause movement of the valve to a flow-restricting position corresponding to a load on the engine and an ambient temperature.

18. The engine system of claim 17, wherein the load on the engine corresponds to a fuel setting of about notch 4 or less.

19. The engine system of claim 17, wherein the controller is configured to move the valve to a non-restricting position when the ambient temperature is above a threshold temperature, regardless of engine load.

20. A method of controlling an engine having a turbocharger with a compressor and a turbine, the method comprising:
   selectively driving the compressor with one of the turbine or the engine to compress air directed into the engine;
   selectively directing liquid and gaseous fuel into the engine;
   combusting a mixture of air and fuel in the engine to generate power and a flow of exhaust directed through the turbine;
   determining a load on the engine; and
   selectively increasing an exhaust backpressure of the engine based on the load only when gaseous fuel is being injected into the engine and only when the compressor of the turbocharger is driven by the engine.

* * * * *